United States Patent
Foletto et al.

(10) Patent No.: US 9,644,999 B2
(45) Date of Patent: *May 9, 2017

(54) MAGNETIC FIELD SENSOR AND ASSOCIATED METHOD THAT CAN ESTABLISH A MEASURED THRESHOLD VALUE AND THAT CAN STORE THE MEASURED THRESHOLD VALUE IN A MEMORY DEVICE

(71) Applicant: Allegro Microsystems, LLC, Worcester, MA (US)

(72) Inventors: Andrea Foletto, Annecy (FR); Peter Cisar, Lenzkirch (DE); Eric Shoemaker, Pembroke, NH (US)

(73) Assignee: Allegro MicroSystems, LLC, Worcester, MA (US)

( * ) Notice: Subject to any disclaimer, the term of this patent is extended or adjusted under 35 U.S.C. 154(b) by 438 days.

This patent is subject to a terminal disclaimer.

(21) Appl. No.: 14/250,574

(22) Filed: Apr. 11, 2014

(65) Prior Publication Data

US 2014/0222364 A1   Aug. 7, 2014

Related U.S. Application Data

(63) Continuation of application No. 13/345,021, filed on Jan. 6, 2012, now Pat. No. 8,736,260.

(51) Int. Cl.
*G01B 7/30* (2006.01)
*G01D 18/00* (2006.01)
(Continued)

(52) U.S. Cl.
CPC ........... *G01D 18/008* (2013.01); *G01D 5/142* (2013.01); *G01D 5/247* (2013.01); *G01D 5/2449* (2013.01); *G01P 3/488* (2013.01)

(58) Field of Classification Search
CPC .. G01R 33/02; G01R 33/0082; G01R 33/075; G01R 33/077; G01R 33/0365;
(Continued)

(56) References Cited

U.S. PATENT DOCUMENTS

| 4,570,594 A | 2/1986 | Egami et al. |
| 5,869,962 A | 2/1999 | Kasumi et al. |

(Continued)

FOREIGN PATENT DOCUMENTS

| DE | 101 39 149 A1 | 2/2003 |
| EP | 0 024 836 A1 | 3/1981 |

(Continued)

OTHER PUBLICATIONS

PCT International Search Report and Written Opinion of the ISA dated Aug. 21, 2014; for PCT Pat. App. No. PCT/US2014/015678; 18 pages.

(Continued)

*Primary Examiner* — Minh N Tang
(74) *Attorney, Agent, or Firm* — Daly, Crowley, Mofford & Durkee, LLP

(57) ABSTRACT

A magnetic field sensor includes a comparator coupled to receive a calculated threshold value based upon a temperature signal, a stored value of a temperature coefficient signal, and a stored value of a measure threshold signal, and also coupled to receive a signal representative of a magnetic field signal. The comparator is configured to compare the calculated threshold value with the signal representative of the magnetic field signal to generate an output signal. A corresponding method is associated with the magnetic field sensor.

27 Claims, 5 Drawing Sheets

(51) Int. Cl.
*G01D 5/247* (2006.01)
*G01P 3/488* (2006.01)
*G01D 5/244* (2006.01)
*G01D 5/14* (2006.01)

(58) Field of Classification Search
CPC .......... G01R 1/44; G01D 5/142; G01D 5/145; G01D 5/147; G01D 5/2449
See application file for complete search history.

(56) References Cited

U.S. PATENT DOCUMENTS

| | | | |
|---|---|---|---|
| 5,917,320 | A | 6/1999 | Scheller et al. |
| 6,091,239 | A | 7/2000 | Vig et al. |
| 6,242,908 | B1 | 6/2001 | Scheller et al. |
| 6,252,395 | B1 | 6/2001 | Aoyama et al. |
| 6,297,627 | B1 | 10/2001 | Towne et al. |
| 6,445,176 | B1 | 9/2002 | Wallrafen |
| 6,525,531 | B2 | 2/2003 | Forrest et al. |
| 6,781,359 | B2 | 8/2004 | Stauth et al. |
| 7,033,071 | B2 | 4/2006 | Otsuka |
| 7,184,876 | B2 | 2/2007 | Teulings et al. |
| 7,199,579 | B2 | 4/2007 | Scheller et al. |
| 7,265,531 | B2 | 9/2007 | Stauth et al. |
| 7,368,904 | B2 | 5/2008 | Scheller et al. |
| 7,923,997 | B2 | 4/2011 | Utsuno |
| 8,350,563 | B2 | 1/2013 | Haas et al. |
| 8,598,867 | B2 | 12/2013 | Foletto et al. |
| 8,723,512 | B1 | 5/2014 | Burdette et al. |
| 8,736,260 | B2 * | 5/2014 | Foletto ........................ 324/173 |
| 8,860,410 | B2 | 10/2014 | Petrie |
| 2005/0146322 | A1 | 7/2005 | Hoffman et al. |
| 2006/0224350 | A1 | 10/2006 | Tanizawa |
| 2007/0164732 | A1 | 7/2007 | Voisine et al. |
| 2008/0074106 | A1 | 3/2008 | Oohira |
| 2009/0206829 | A1 | 8/2009 | Kamiya et al. |
| 2010/0046121 | A1 | 2/2010 | Osugi et al. |
| 2010/0181993 | A1 | 7/2010 | Fernandez et al. |
| 2011/0119015 | A1 | 5/2011 | Hirobe et al. |
| 2011/0298448 | A1 | 12/2011 | Foletto et al. |
| 2011/0298450 | A1 | 12/2011 | Foletto et al. |
| 2012/0158335 | A1 | 6/2012 | Donovan et al. |
| 2012/0217955 | A1 | 8/2012 | Petrie |
| 2012/0249126 | A1 | 10/2012 | Friedrich et al. |
| 2012/0299588 | A1 | 11/2012 | Petrie |
| 2013/0093416 | A1 | 4/2013 | Haas et al. |
| 2013/0116945 | A1 | 5/2013 | Forrest et al. |
| 2013/0176012 | A1 | 7/2013 | Eagen et al. |
| 2013/0177040 | A1 | 7/2013 | Foletto et al. |
| 2013/0335069 | A1 | 12/2013 | Vig et al. |
| 2014/0062463 | A1 | 3/2014 | Foletto et al. |
| 2014/0266176 | A1 | 9/2014 | Fernandez et al. |

FOREIGN PATENT DOCUMENTS

| | | |
|---|---|---|
| EP | 0 456 302 A2 | 11/1991 |
| EP | 0 456 302 A3 | 11/1991 |
| EP | 0 456 392 A2 | 11/1991 |
| JP | H04-40007 | 2/1992 |
| JP | H11-257993 | 9/1999 |
| JP | 2000-258162 A | 9/2000 |
| JP | 2001-153745 A | 6/2001 |
| JP | 2003-315770 | 11/2003 |
| JP | 2004-245804 | 9/2004 |
| JP | 2004-245804 A | 9/2004 |
| JP | 2004-279324 A | 10/2004 |
| JP | 2006-284375 | 10/2006 |
| JP | 2008-256415 | 10/2008 |
| JP | 2008-309626 A | 12/2008 |
| JP | 2009-20117 | 1/2009 |
| JP | 2009/128437 A | 6/2009 |
| JP | 2009-281881 A | 12/2009 |
| JP | 2010/049755 A | 3/2010 |
| WO | WO 2004 079385 A1 | 9/2004 |
| WO | WO 2007/000746 A2 | 1/2007 |
| WO | WO 2009/154157 A1 | 12/2009 |
| WO | WO 2010/010811 A1 | 1/2010 |
| WO | WO 2013/017211 A1 | 2/2013 |

OTHER PUBLICATIONS

Response dated Oct. 2, 2015 to Office Action dated Jul. 2, 2015; For U.S. Appl. No. 13/877,847; 12 pages.
Supplemental Amendment dated Oct. 6, 2015; For U.S. Appl. No. 13/877,847; 10 pages.
Response dated Jan. 28, 2016 to European Office Action dated Aug. 3, 2015; For European Pat. App. No. 15156091.9; 5 pages.
European Notice of Allowance dated Jan. 29, 2015; for European Pat. App. No. 11767332.7; 2 pages.
Letter to Yuasa and Hara with Claim Amendments dated Jan. 25, 2016; For Japanese Pat. App. No. 2013-533859; 18 pages.
Letter from Yuasa and Hara dated Mar. 8, 2016; For Japanese Pat. App. No. 2013-533859; 2 pages.
Claims on File dated Mar. 8, 2016; For Japanese Pat. App. No. 2013-533859; 7 pages.
Letter from Yuasa and Hara dated Mar. 8, 2016; For Japanese Pat. App. No. 2016-030552; 2 pages.
Japanese Reasons for Rejection (English Translation) dated Feb. 24, 2015; for Japanese Pat. App. No. 2013-533859; 11 pages.
Request for Continued Exaination filed Apr. 14, 2015; for U.S. Appl. No. 13/705,423; 2 pages.
U.S. Appl. No. 13/526,113, filed Jun. 18, 2012, Dwyer et al.
U.S. Appl. No. 13/526,099, filed Jun. 18, 2012, Dwyer et al.
U.S. Appl. No. 13/685,287, filed Nov. 26, 2012, Burdette et al.
U.S. Appl. No. 13/705,423, filed Dec. 5, 2012, Haas et al.
U.S. Appl. No. 13/752,681, filed Jan. 29, 2013, Wang.
U.S. Appl. No. 13/833,847, filed Mar. 15, 2013, Fernandez et al.
Allegro Microsystems, Inc.; Design Intent Data Sheet; A1340; "High Precision, Highly Programmable Linear Hall Effect Sensor IC with EEPROM and Analog Output with Advanced Output Linearization Capabilities;" Sep. 10, 2009; pp. 1-40.
Allegro Microsystems, Inc.; Design Intent Data Sheet; A1341; "High Precision, Highly Programmable Linear Hall Effect Sensor IC with EEPROM, Output Protocols SENT and PWM, and Advanced Output Linearization Capabilities;" May 17, 2010; pp. 1-46.
Allegro Microsystems, Inc.; Data Sheet ATS673 and ATS674; Self-Calibrating Gear Tooth Sensor IC Optimized for Automotive Cam Sensing Application; Jan. 14, 2005; 20 pages.
Allegro Microsystems, Inc.; Data Sheet ATS675LSE; Self-Calibrating TPOS Speed Sensor IC Optimized for Automotive Cam Sensing Applications; Jul. 14, 2008; 13 pages.
Melexis MLX 90324; ""Under-the-Hood" Triaxis Rotary Position feat. SENT Protocol;" 3901090324 Data Sheet; Dec. 2008; 40 pages.
Response to European Official Communication filed on Oct. 31, 2013; for European Pat. App. No. 11767332.7; 21 pages.
PCT Search Report and Written Opinion dated Nov. 14, 2011; for PCT Pat. App. No. PCT/US2011/051493; 12 pages.
PCT Search Report and Written Opinion of the ISA; dated Mar. 27, 2013; for PCT Pat. App. No. PCT/US2012/068879; 10 pages.
European Official Communication; dated Apr. 13, 2013; for EP Pat. App. No. 11767332.7; 2 pages.
European Notice of Allowance dated Aug. 29, 2014; for European Pat. App. No. 11 767 332.7; 7 pages.
PCT International Preliminary Report on Patentability and Written Opinion of the ISA; dated Apr. 25, 2013; for PCT Pat. App. No. PCT/2011/051493; 10 pages.
PCT International Preliminary Report on Patentability with Written Opinion for PCT/US2012/068879 dated Jul. 17, 2014 7 pages.
U.S. Appl. No. 14/452,823, filed Aug. 6, 2014, Fernandez et al.
PCT Invitation to Pay Additional Fees and Partial Search Report of the ISA dated May 9, 2014; for PCT Pat. App. No. PCT/US2014/015678; 5 pages.
European Response to Written Opinion (includng English claims) filed on May 19, 2015; for European Pat. App. No. 12809919.9; 4 pages.

(56) References Cited

OTHER PUBLICATIONS

Letter to Yuasa and Hara (including English claims) dated May 4, 2015; for Japanese Pat. App. No. 2013-533859; 15 pages.
Japanese Response (including English claims) filed on May 14, 2015; for Japanese Pat. App. No. 2013-533859; 21 pages.
Letter from Yuasa and Hara dated May 30, 2016; For Japanese Pat. App. No. 2013-533859; 3 pages.
Pre-Trial Report with English Translation dated Apr. 14, 2016; For Japanese Pat. App. No. 2013-533859; 9 pages.
Notice of Transferal dated Apr. 26, 2016; For Japanese Pat. App. No. 2013-533859; 1 page.
Claims on File dated May 30, 2016; For Japanese Pat. App. No. 2013-533859; 7 pages.
Japanese Voluntary Amendment (With Reporting Letter and Claims in English) filed on Jun. 14, 2016 for Japanese application No. 2016-030552; 16 Pages.
Office Action dated Jul. 2, 2015; for U.S. Appl. No. 13/833,847; 42 pages.
European Search Report dated Apr. 21, 2015; for European Pat. App. No. 15156091.9; 9 pages.
Notice of Allowance dated Sep. 12, 2012; for U.S. Appl. No. 12/902,410; 13 pages.
Notice of Allowance dated Jan. 17, 2014; for U.S. Appl. No. 13/345,021; 15 pages.
PCT International Preliminary Report or Patentability and Written Opinion of the ISA dated Sep. 24, 2015; For Pat. App. No. PCT/US2014/015678; 13 pages.
Japanese Office Action with English translation dated Oct. 27, 2015; For Japanese Pat. App. 2013-533859; 4 pages.
Notice of Allowance dated Jan. 20, 2016; For U.S. Appl. No. 13/833,847; 14 pages.
Notice of Allowance dated Dec. 19, 2014; for U.S. Appl. No. 13/705,423; 18 pages.
Response dated Apr. 28, 2016 to Office Action dated Oct. 21, 2015; For European Pat. App. No. 14706448.9; 4 pages.
Amended Specification and Claims dated Apr. 28, 2016; For European Pat. App. No. 14706448.9; 11 pages.
Translation of Reasons for Rejection dated Dec. 26, 2016 for JP Pat. Appl. No. 2016-030552; 11 pages.
Claims now on file from Yuasa and Hara Letter dated Jan. 25, 2017 for JP Pat. Appl. No. 2016- 030552; 8 pages.
Letter from Yuasa and Hara dated Feb. 16, 2017 for JP Pat. Appl. No. 2016-500232; 1 page.
English translation of Claims Now on File related to Yuasa and Hara letter dated Feb. 16, 2017 for JP Pat. Appl. No. 2016-500232; 13 pages.
Letter to Yuasa and Hara dated Jan. 6, 2017 for JP Pat. Appl. No. 2016-500232; 2 pages.
Amended Claims dated Jan. 6, 2017 for JP Pat. Appl. No. 2016-500232; 8 pages.
Claims dated Jan. 6, 2017 for U.S. Appl. No. 15/132,642; 9 pages.

* cited by examiner

MAGNETIC FIELD SENSOR AND ASSOCIATED METHOD THAT CAN ESTABLISH A MEASURED THRESHOLD VALUE AND THAT CAN STORE THE MEASURED THRESHOLD VALUE IN A MEMORY DEVICE

CROSS REFERENCE TO RELATED APPLICATIONS

This application is a Continuation application of and claims the benefit of U.S. patent application Ser. No. 13/345,021, filed Jan. 6, 2012, now U.S. Pat. No. 8,736,260, issued May 27, 2014, which are incorporated herein by reference in their entirety.

STATEMENT REGARDING FEDERALLY SPONSORED RESEARCH

Not Applicable.

FIELD OF THE INVENTION

This invention relates generally to magnetic field sensors for sensing a rotation or a movement of an object and, more particularly, to a magnitude field sensor that generates a measured threshold value that can be stored in a memory device and later recalled.

BACKGROUND OF THE INVENTION

Various types of magnetic field sensing elements are known, including Hall effect elements and magnetoresistance elements. Magnetic field sensors generally include a magnetic field sensing element and other electronic components. Some magnetic field sensors also include a fixed permanent magnet.

Magnetic field sensors provide an electrical signal representative of a sensed magnetic field, or, in some embodiments, fluctuations of the magnetic field associated with the magnet. In the presence of a moving ferromagnetic object, the magnetic field sensed by the magnetic field sensor can vary in accordance with a shape or profile of the moving ferromagnetic object.

Magnetic field sensors are often used to detect movement of features of a ferromagnetic gear, such as gear teeth and/or gear slots. A magnetic field sensor in this application is commonly referred to as a "gear tooth" sensor.

In some arrangements, the gear in placed upon a target object, for example, a camshaft in an engine, thus the rotation of the target object (e.g., camshaft) is sensed by detection of the moving features of the gear. Gear tooth sensors can be used in automotive applications, for example, to provide information to an engine control processor for ignition timing control, fuel management, and other operations.

Information provided by the gear tooth sensor to the engine control processor can include, but is not limited to, an absolute angle of rotation of a target object (e.g., a camshaft) as it rotates, and a direction of rotation. With this information, the engine control processor can adjust the timing of firing of the ignition system and the timing of fuel injection by the fuel injection system. Thus, it will be recognized that accurate information about the angle of rotation is important for proper engine operation.

Gear tooth sensors can also be used in other applications, including, but not limited to, anti-lock braking systems and in transmissions.

Many types of magnetic field sensors do not provide an accurate output signal (e.g., indication of absolute angle of rotation of an object) immediately upon power up of the magnetic field sensor, and/or immediately upon movement of the target object from zero rotating speed, and/or upon movement slowing to zero rotating speed, but instead provide an accurate output signal only once the magnetic field sensor has been powered up for a period of time, and the target object has moved through a substantial rotation or is moving with substantial speed.

The above accurate output signal refers to accuracy of the positions of transition edges in the output signal from the magnetic field sensor.

In general, a so-called "running mode" detector can provide an accurate output signal only after some period following power up of the magnetic field sensor and after the gear has been rotating for some period of time. In contrast, in general, a so-called "true power on state" (TPOS) detector can provide a reasonably accurate output signal, but less accurate than the running mode detector, at an earlier time after magnetic field sensor powers up and at an earlier time after the gear starts rotating.

One type of running mode detector is described in U.S. Pat. No. 6,525,531, issued Feb. 25, 2003. This running mode detector includes a positive digital-to-analog converter (PDAC) and a negative digital-to-analog converter (NDAC) that track positive and negative peaks of magnetic field signal, respectively, for use in generating a threshold signal. A varying magnetic field signal is compared to the threshold signal. However, the outputs of the PDAC and the NDAC may not provide accurate indications of the positive and negative peaks of the magnetic field signal until several cycles of the signal (i.e., signal peaks) occur (i.e., until several gear teeth have passed).

A conventional TPOS detector is described in U.S. Pat. No. 7,362,094, issued Apr. 22, 2008. A conventional TPOS detector simply compares a magnetic field signal with a fixed and predetermined threshold.

The TPOS detector can be used in conjunction with a running mode detector, both providing information to the engine control processor. A TPOS detector can be combined in the same integrated circuit with a running mode detector, and the magnetic field sensor after power up, can first use the TPOS detector and then switch to the running mode detector.

As described above, the conventional TPOS detector provides a reasonably accurate output signal with only a small initial rotation of the target object, and before the running mode detector can provide an accurate output signal. The TPOS detector can provide information to the engine control processor that can be more accurate than information provided by the running mode detector nearly immediately upon power up of the magnetic field sensor and for time periods near the beginning and end of rotation of the target object (e.g., start and stop of the engine and camshaft), but which may be less accurate than the output signal provided by a running mode detector at some time after the magnetic field sensor has powered up and when the object is rotating at speed. When the object is rotating at speed, the engine control processor can primarily use rotation information provided by the running mode detector.

As described above, unlike the running mode detector, the conventional TPOS detector has a fixed predetermined threshold against which a magnetic field signal is compared to generate an output signal having at least two states, and typically a high and a low state. The state of the conventional TPOS output signal is high at some times and low at other times as the target object rotates, in accordance with features on the TPOS cam attached to the target object.

It is known that various parameters affect a magnitude of the magnetic field signal generated by the TPOS magnetic field sensor. For example, temperature is known to affect a sensitivity of the Hall element, and therefore, a magnitude of the magnetic field signal. Changes in size of an air gap between the TPOS magnetic field sensor and the TPOS cam or gear can also affect a magnitude of the magnetic field signal.

When the magnetic field signal is compared against a fixed predetermined threshold, the changes in the amplitude of the magnetic field signal due to temperature, air gap, etc., can cause undesirable changes in positions of the edges in the above-described output signal from the TPOS detector.

It would be desirable to provide TPOS detector for which positions of edges of an output signal therefrom vary less than for a conventional TPOS detector.

SUMMARY OF THE INVENTION

The present invention provides a TPOS detector for which positions of edges of an output signal therefrom vary less than for a conventional TPOS detector.

In accordance with one aspect of the present invention, a magnetic field sensor includes a magnetic field sensing element responsive to a changing magnetic field and configured to generate a magnetic field signal having an amplitude. The magnetic field sensor also includes an amplitude module configured to generate an amplitude signal representative of the amplitude of the magnetic field signal. The magnetic field sensor also includes a measured threshold module coupled to receive a positive peak signal and a negative peak signal representative of positive peaks and negative peaks, respectively, of the magnetic field signal, and configured to generate a measured threshold signal in accordance with the positive peak signal and the negative peak signal. The magnetic field sensor also includes a temperature sensor configured to sense a temperature of the magnetic field sensor and configured to generate a temperature signal in accordance with the temperature. The magnetic field sensor also includes a temperature coefficient module coupled to receive the temperature signal, coupled to receive the amplitude signal, and configured to generate a temperature coefficient signal in accordance with the temperature signal and the amplitude signal. The magnetic field sensor also includes a memory device coupled to receive and configured to store, at each one of a plurality of storage times, a respective value of the temperature coefficient signal and a respective value of the measured threshold signal. The magnetic field sensor also includes a threshold module coupled to receive, at a calculation time, a stored value of the temperature coefficient signal and a stored value of the measured threshold signal, each stored at a selected one of the plurality of storage times prior to the calculation time, and coupled to receive the temperature signal. The threshold module is configured to combine the received stored value of the temperature coefficient signal, the received stored value of the measured threshold signal, and the temperature signal to generate a calculated threshold value. The magnetic field sensor also includes a true power on state (TPOS) detector coupled to receive the calculated threshold value and also coupled to receive a signal representative of the magnetic field signal. The true power on state (TPOS) detector is configured to compare the calculated threshold value with a signal representative of the magnetic field signal to generate an output signal.

In some embodiments, the magnetic field sensor is powered off between the selected one of the plurality of storage times and the calculation time, and the memory device is nonvolatile and re-writable.

In another aspect of the present invention, a method of sensing a magnetic field with a magnetic field sensor includes generating a magnetic field signal having an amplitude in response to a magnetic field. The method also includes generating an amplitude signal representative of the amplitude of the magnetic field signal. The method also includes generating a measured threshold signal in accordance with positive and negative peaks of the magnetic field signal. The method also includes generating a temperature signal in accordance with a temperature. The method also includes generating a temperature coefficient signal in accordance with the temperature signal and the amplitude signal. The method also includes storing, at each one of a plurality of storage times, a respective value of the temperature coefficient signal and a respective value of the measured threshold signal. The method also includes receiving, at a calculation time, a stored value of the temperature coefficient signal and a stored value of the measured threshold signal, each stored at a selected one of the plurality of storage times prior to the calculation time. The method also includes combining the received stored value of the temperature coefficient signal, the received stored value of the measured threshold signal, and the temperature signal to generate a calculated threshold value. The method also includes comparing the calculated threshold value with a signal representative of the magnetic field signal to generate an output signal.

In some embodiments, the method includes powering off between the selected one of the plurality of storage times and the calculation time, and the storing is nonvolatile and re-writable.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the present invention, some introductory concepts and terminology are explained.

As used herein, the term "magnetic field sensing element" is used to describe a variety of electronic elements that can sense a magnetic field. The magnetic field sensing elements can be, but are not limited to, Hall effect elements, magnetoresistance elements, or magnetotransistors. As is known, there are different types of Hall effect elements, for example, a planar Hall element, a vertical Hall element, and a circular Hall element. As is also known, there are different types of magnetoresistance elements, for example, a giant magnetoresistance (GMR) element, an anisotropic magnetoresistance element (AMR), a tunneling magnetoresistance (TMR) element, an Indium antimonide (InSb) sensor, and a magnetic tunnel junction (MTJ).

A so-called "circular vertical Hall" (CVH) sensing element, another type of magnetic field sensing element, which includes a plurality of vertical magnetic field sensing elements, is known and described in PCT Patent Application No. PCT/EP2008056517, entitled "Magnetic Field Sensor for Measuring Direction of a Magnetic Field in a Plane," filed May 28, 2008, and published in the English language as PCT Publication No. WO 2008/145662, which application and publication thereof are incorporated by reference herein in their entirety. The CVH sensing element includes a circular arrangement of vertical Hall elements arranged over a common circular implant region in a substrate. The CVH sensing element can be used to sense a direction (and optionally a strength) of a magnetic field in a plane of the substrate.

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while magnetoresistance elements and vertical Hall elements (including circular vertical Hall (CVH) sensing elements) tend to have axes of sensitivity parallel to a substrate.

While exemplary circuits and methods are described below that use a Hall element, in other embodiments, the same or similar techniques can be used in conjunction with another type of magnetic field sensing element.

Figure 1:
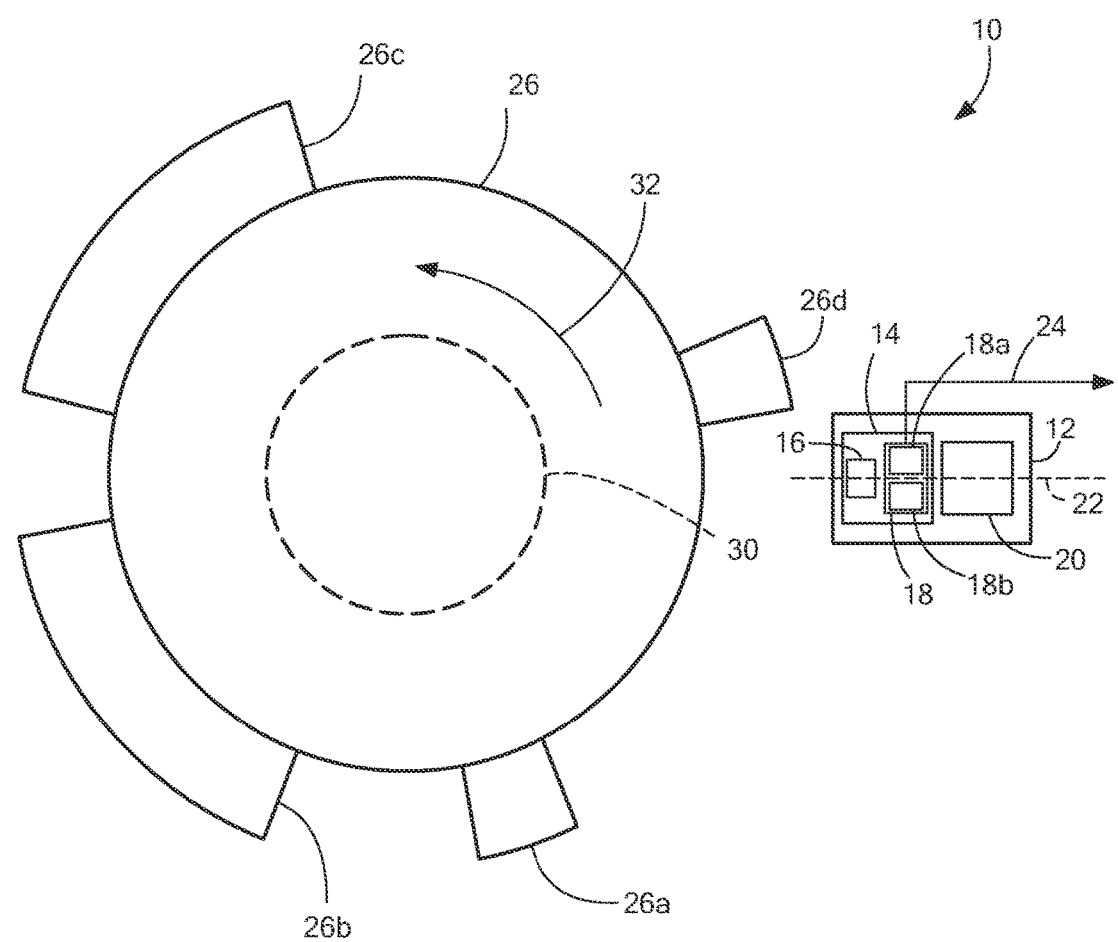
FIG. 1 is a block diagram showing a magnetic field sensor having a "true power on state" (TPOS) detector and a "running mode" detector, which is proximate to a cam having cam features, the cam disposed upon a shaft configured to rotate, i.e., upon a target object.

Referring to FIG. 1, an exemplary magnetic field sensor arrangement 10 includes a magnetic field sensor 12. The magnetic field sensor 12 includes a magnetic field sensing circuit 14 having a magnetic field sensing element 16 coupled to an electronic circuit 18. The electronic circuit 18 can include a TPOS detector 18a and a running mode detector 18b, both of which are described more fully below. In other embodiments, the magnetic field sensor 12 does not have the running mode detector 18b.

The magnetic field sensor 12 can also include a magnet 20. The magnet 20 is configured to generate a magnetic field directed along an axis 22. The electronic circuit 18 is configured to generate an output signal 24, which is generated by the TPOS detector 18a for a time period near to a start up of the magnetic field sensor 12, and which can be generated by the running mode detector thereafter.

The magnetic field sensor arrangement 10 can also include a cam 26 (e.g., gear) having features 26a, 26b, 26c, 26d. The cam 26 can be disposed, for example, upon a shaft 30 (i.e., a target object) configured to rotate in a direction 32.

In operation, as the cam 26 rotates, the cam features 26a, 26b, 26c, 26d interrupt the magnetic field generated by the magnet 20. Interruptions of the magnetic field generated by the magnet 20 are sensed by the magnetic field sensing element 16 and result in state transitions in the output signal 24.

Particular arrangement and spacing of the cam features 26a, 26b, 26c, 26d results in the TPOS detector 18a being able to provide the TPOS output signal 24 having transitions after only a small number of degrees of rotation of the TPOS cam 26, which, in some embodiments, can be interpreted by an engine control computer to generate an absolute angle of rotation of the cam 26 and of the shaft 30 upon which the cam 26 is disposed.

Furthermore, by circuits and techniques described below, the TPOS detector 18a can provide an accurate output signal at the time of power up of the magnetic field sensor 12.

Figure 2:
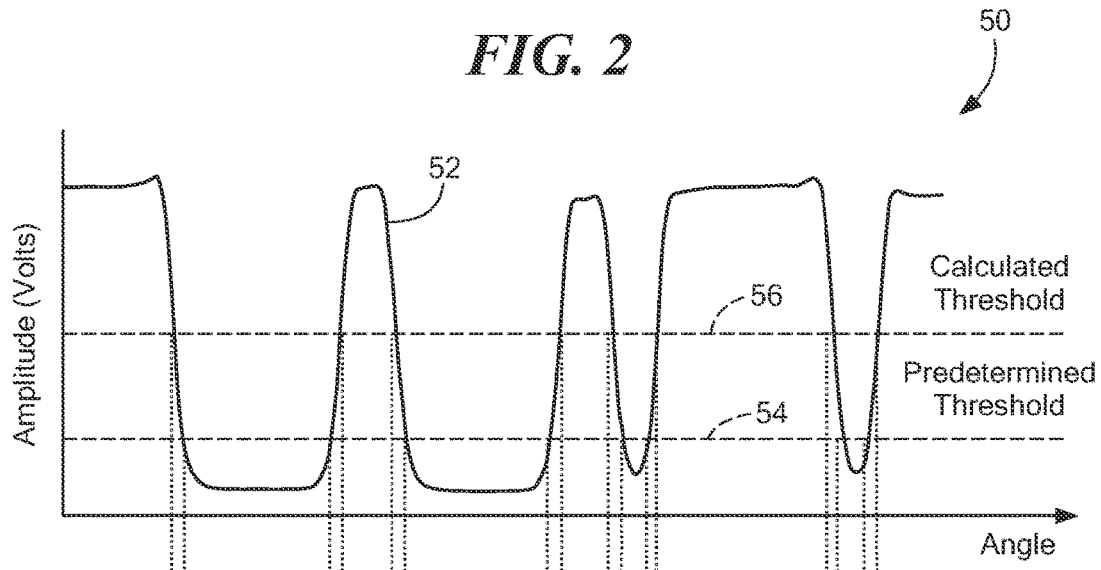
FIG. 2 is a block diagram showing a magnetic field signal and showing an exemplary calculated threshold and an exemplary predetermined threshold that can be compared with the magnetic field signal within the TPOS detector of FIG. 1.

Referring now to FIG. 2, a graph 50 has a horizontal axis with a scale in units of target object rotation angle, for example, from 0 to 360 degrees. The graph 50 also includes a vertical axis having a scale with units of volts in arbitrary units. A signal 52 can be the same as or similar to a magnetic field signal generated within the magnetic field sensor 12 of FIG. 1, for example, in conjunction with the magnetic field sensing element 16. It should be appreciated that the high state periods of the signal 62 correspond to the features 26a, 26b, 26c, 26d of the cam 26 of FIG. 1 as they pass by the magnetic field sensing element 16 of FIG. 1 as the cam 26 rotates.

The magnetic field signal 52 is shown in analog form having continuous analog values, but can equivalently be a signal having discrete digital values comparable to sampled ones of the analog values.

A predetermined threshold 54 is shown and further described below in conjunction with FIG. 3. The predetermined threshold 54 is similar to that which is used in a conventional TPOS detector. A calculated threshold 56, calculated (at different respective times) in accordance with one of a plurality of stored measured threshold is also shown and further described below in conjunction with FIG. 3. The calculated threshold 56, calculated in accordance with one of the plurality of stored measured threshold values, is not used by a conventional TPOS detector.

Figure 3:
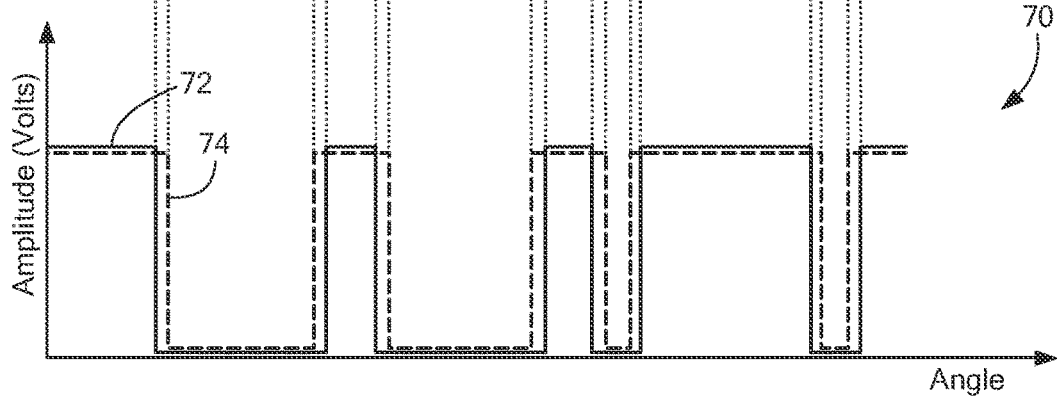
FIG. 3 is a graph showing signals resulting from the comparisons of FIG. 2.

Referring now to FIG. 3, a graph 70 has a horizontal axis with a scale in units of target object rotation angle, for example, from 0 to 360 degrees. The graph 70 also includes a vertical axis having a scale with units of volts in arbitrary units.

A signal 74 has two states, positions of transitions between which are determined by crossings of the signal 52 of FIG. 2 above and below the predetermined threshold 54. A signal 72 has two states, positions of transitions between which are determined by crossings of the signal 52 of FIG. 2 above and below the calculated threshold 56. Accordingly, it can be seen that changes in the position, i.e., the value, of the threshold used to compare against the signal 52 of FIG. 2, affects positions of the transitions, i.e., edges, of the resulting two state signal. As described above, when used for many applications, including, but not limited to automotive applications, positions of the edges can be very important to proper operation of the automobile.

As described above, the magnetic field signal 52 can vary in amplitude due to a variety of environmental and electronic factors, for example, temperature and air gap between the magnetic field sensor and the sensed cam or gear. It would be desirable to maintain a threshold signal comparable to the calculated threshold 56 of FIG. 2 that is midway between positive peaks and negative peaks of the magnetic field signal 52, even as the amplitude of the positive and negative peaks changes, for example, due to temperature, air gap between the magnetic field sensing element 16 of FIG. 1 and the cam 26, or other parameters. With such an arrangement, edges of the resulting two state signal can remain at the same positions even if the amplitudes of the positive and negative peaks of the magnetic field signal 52 change and even if they change asymmetrically.

Figure 4:
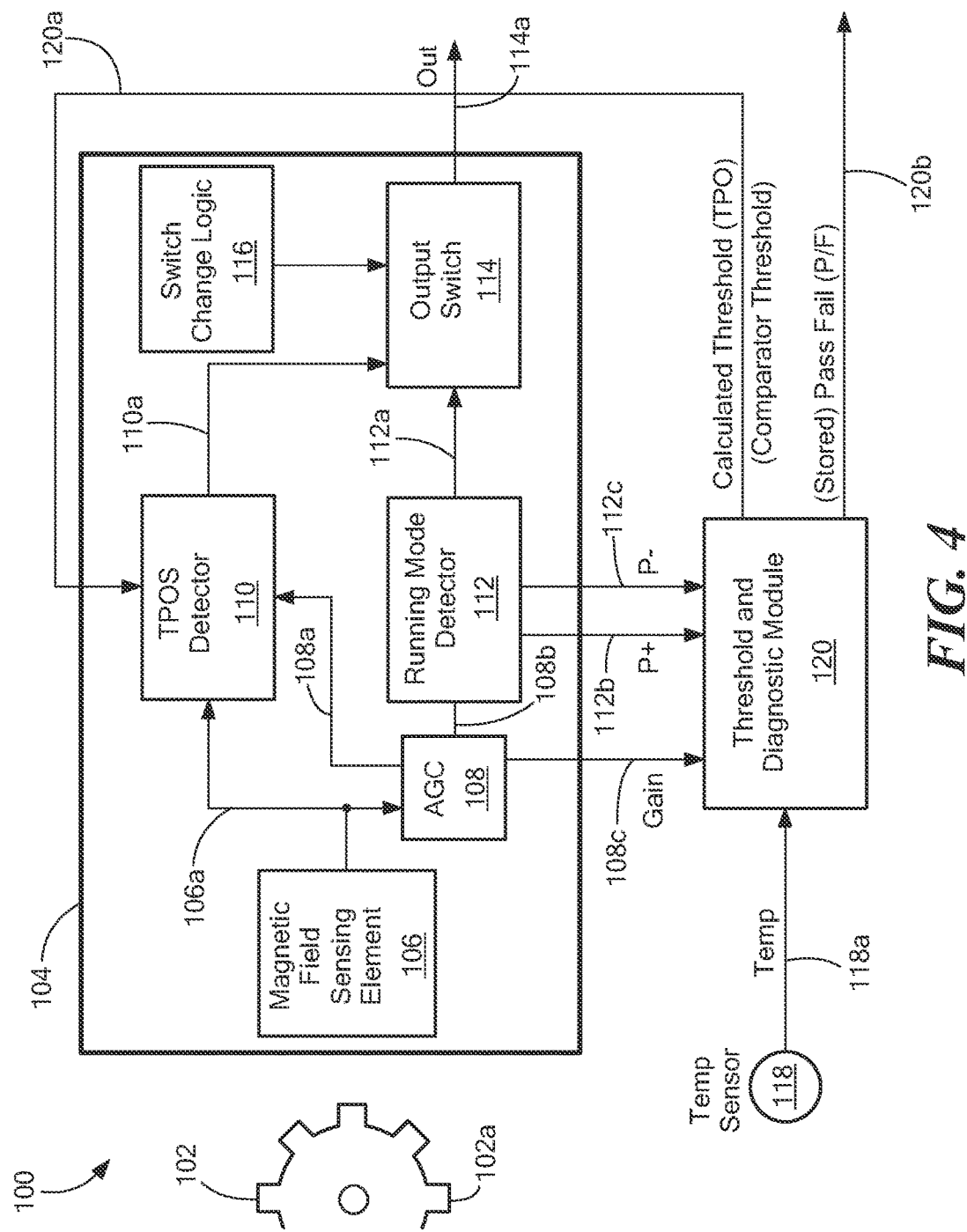
FIG. 4 is a block diagram showing further details of the magnetic field sensor of FIG. 1 and having a threshold and diagnostic module.

Referring now to FIG. 4, a magnetic field sensor 100 can be the same as or similar to the magnetic field sensor 12 of FIG. 1. The magnetic field sensor 100 can be disposed proximate to a cam or gear 102 having features or teeth 102*a*. A magnet, like the magnet 20 of FIG. 1 is not shown but can be disposed proximate to or within the magnetic field sensor 100.

A portion 104 of the magnetic field sensor 100 is shown within a box and a portion outside of the box to better explain the subject matter of FIG. 5 below.

The magnetic field sensor 100 can include a magnetic field sensing element 106, for example, a Hall element. The magnetic field sensing element 106 can provide a magnetic field signal 106*a* having positive and negative peaks, and which is responsive to fluctuations in a magnetic field, the fluctuations caused by passing gear teeth of the gear 102.

The magnetic field signal 106*a* can be received by a true power on state (TPOS) detector 110. The TPOS detector 110 can generate an output signal 110*a*, which can be the same as or similar to the signal 72 of FIG. 3.

An automatic gain control (AGC) 108 can also receive the magnetic field signal 106*a*. The AGC 108 can generate an amplified signal 108*b*, which is an amplitude controlled version of the magnetic field signal 106*a*. A running mode detector 112 can be coupled to receive the signal 108*b*. The running mode detector can generate an output signal 112*a*. The output signal 112*a* can be similar to the signal 72 of FIG. 3, but is generally produced having good edge accuracy later in time than the signal 110*a*.

In some embodiments, the magnetic field sensor does not include the AGC 108, in which case, the magnetic field signal 106*a* is received by both the TPOS detector 110 and the running mode detector 112.

The output signals 110*a*, 112*a* can be received by an output switch 114. The output switch 114 can also be coupled to receive a control signal 116*a* generated by switch change logic 116. The control signal 116*a* selects between the output signals 110*a* and 112*a* and provides one of the output signals as an output signal 114*a*.

The switch change logic 116 generally selects, as the output signal 114*a*, the output signal 110*a* from the TPOS detector 110 when the magnetic field sensor 104 first powers up or when the gear 102 first starts rotating or when the gear 102 is slowing to a stop. The output signal 114*a* remains as the output signal 110*a* for a period of time determined by the switch change logic 116. After the period of time, and once the gear 102 is rotating at a reasonably constant speed, the switch change logic 116 selects, as the output signal 114*a*, the output signal 112*a* from the running mode detector 112.

Operation and logic of the switch change logic 116 is not described further herein. However, exemplary operation and logic can be found within U.S. Pat. No. 7,362,094 listed above, which is incorporated by reference herein.

The magnetic field sensor 100 can also include a threshold and diagnostic module 120. This threshold and diagnostic module 120 is coupled to receive, from the AGC 108, a gain indicating signal 108*c*, representative of an amount of gain applied by the AGC 108. The threshold and diagnostic module 120 is also coupled to receive positive and negative peak signals 112*b*, 112*c*, respectively, from the running mode detector 112, which are indicative of magnitudes of positive peaks (P+) and negative peaks (P−) of the gain controlled magnetic field signal 108*b*.

A temperature sensor 118 generates a temperature signal 118*a* received by the threshold and diagnostic module 120. In operation, with the various inputs provided to the threshold and diagnostic module 120, the threshold and diagnostic module 120 can generate a calculated threshold value 120*a*, which is like the calculated threshold 56 of FIG. 2. The calculated threshold value 120*a* can be maintained at any value, for example, a value representative of a halfway point, between the positive and negative peaks represented by the signals 112*b*, 112*c*.

In some embodiments, the calculated threshold value 120*a* is a value that is referenced to (i.e., suitable for comparison with) the magnetic field signal 106*a*. However, in other embodiments, the calculated threshold value 120*a* is a value that is referenced to (i.e., suitable for comparison with) the amplified signal 108*b*.

If the TPOS detector is coupled to receive the magnetic field signal 106*a* as shown, and, if the calculated threshold value 120*a* is scaled to suit the amplified magnetic field signal 108*b*, a signal 108*a* can be provided from the AGC 108 to the TPOS detector 100 to properly position the calculated threshold value 120*a* for comparison with the magnetic field signal 106*a*. However, other arrangements are also possible. For all arrangements, it is necessary to compare a calculated threshold value referenced to either the magnetic field signal 106*a* or to the amplified signal 108*b* with the proper respective one of the magnetic field signal 106*a* or the amplified signal 108*b*.

Further discussion below assumes that the calculate threshold value 120*a* is referenced to the magnetic field signal 106*a*, in which case, the signal 108*a* may be omitted.

It will become apparent from discussion below in conjunction with FIG. 5, that the threshold and diagnostic module 120 has memory that can store a measured threshold value and a measure temperature coefficient value that can be used to generate the calculated threshold value 120*a*. The threshold and diagnostic module 120 can provide the calculated threshold value 120*a* to the TPOS detector 110 nearly immediately upon power up of the magnetic field sensor 100, and the TPOS detector 110 does not have to rely upon a predetermined fixed threshold.

The threshold and diagnostic module 120 can also generate a pass fail signal 120*b*, which, in some embodiments, can be stored in the threshold diagnostic module 120.

It should be apparent that with the arrangement of the magnetic field sensor 100, the TPOS detector 110 achieves more accurate edge placements in the output signal 110*a*, comparable to edge placements of the signal 72 of FIG. 3, nearly immediately upon power up of the magnetic field sensor 100. However, it should also be apparent that, upon a very first power up of the magnetic field sensor 100 following its installation, and before the threshold and diagnostic module 120 has successfully computed and stored a calculated threshold value, the TPOS detector 110 must still use a predetermined threshold, comparable to the predetermined threshold 54 of FIG. 2.

Figure 5:
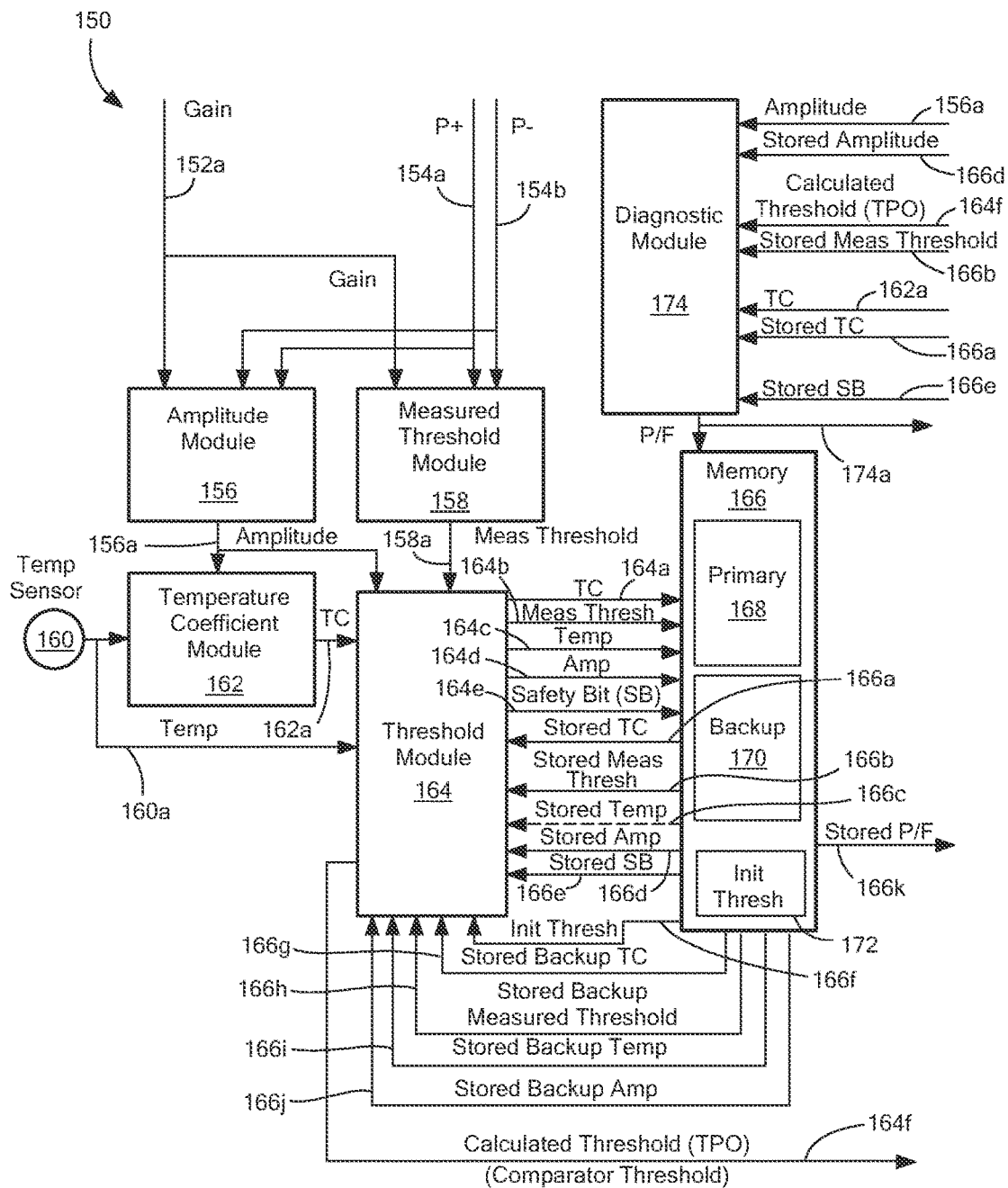
FIG. 5 is a block diagram showing an exemplary threshold and diagnostic module that can be used as the threshold and diagnostic module of FIG. 4.

Referring now to FIG. 5, a threshold and diagnostic module 150 can be the same as or similar to the threshold and diagnostic module 120 of FIG. 4. The threshold and diagnostic module 150 is coupled to receive a gain signal 152*a*, which can be the same as or similar to the gain signal 108*b* of FIG. 4. The threshold and diagnostic module 150 is also coupled to receive positive and negative peak signals 154*a*, 154*b*, which can be the same as or similar to the positive and negative peaks signals 112*b*, 112*c*, respectively, of FIG. 4.

As described above, the gain signal 152*a* is representative of the gain setting of the automatic gain control 108 of FIG. 4. As also described above, the positive and negative peak signals 154*a*, 154*b*, respectively, are representative of positive and negative peaks of the amplified signal 108*b* of FIG. 4.

An amplitude module 156 is coupled to receive the gain signal 152*a* and coupled to receive the positive and negative peak signals 154*a*, 154*b*, respectively, which are generated by the running mode processor 112 of FIG. 4. The amplitude module 156 is configured to generate an amplitude signal 156*a* representative of a peak-to-peak amplitude of the non-amplified magnetic field signal, for example, the magnetic field signal 106*a* of FIG. 4.

A measured threshold module 158 is coupled to receive the positive and negative peak signals 154*a*, 154*b*, respectively, and coupled to receive the gain signal 152*a*. The measured threshold module 158 is configured to generate a measured threshold signal 158*a*, which is representative of a measured threshold, for example, a value representative of a value between the positive and negative peak signals 154*a*, 154*b*, for example, a value representative of a value centered between the positive and negative peak signals 154*a*, 154*b*.

The positive and negative peak signals 154*a*, 154*b* are representative of positive and negative peak amplitudes of the amplified signal 108*b* of FIG. 4. The gain signal 152*a* can be used by the measured threshold module 158 to reference the measured threshold signal 158*a* to a point before the gain of the AGC 108 of FIG. 4, and, in some embodiments, reference the measured threshold signal 158*a* to a peak-to-peak amplitude of the magnetic field signal 106*a* of FIG. 4.

In view of the above, it should be understood that the measured threshold signal 158*a* is representative of a measured threshold signal referenced to the magnetic field signal 106*a* of FIG. 4, prior to the gain of the AGC 108. Accordingly, the TPOS detector 110 of FIG. 4 can be coupled to receive the magnetic field signal 106*a* prior to the gain of the AGC 108.

It should also be understood that the re-referencing of the measured threshold signal 158*a* could instead be done at other points in the flow of signals described below.

A temperature sensor 160 can be the same as or similar to the temperature sensor 118 of FIG. 4. The temperature sensor 160 is configured to generate a temperature signal 160*a*, which is representative of a temperature of the environment of temperature sensor 160 and of the magnetic field sensor 100 of FIG. 4.

A temperature coefficient module 162 is coupled to receive the temperature signal 160*a* and coupled to receive the amplitude signal 156*a*. The temperature coefficient module 162 is configured to generate a temperature coefficient signal 162*a*, which can be representative of a temperature coefficient of the amplitude signal 156*a*, for example, in units of mV per degree Celsius. In order to generate the temperature coefficient, it will be understood that the magnetic field sensor must experience more than one temperature.

A threshold module 164 is coupled to receive the temperature coefficient signal 162*a*, coupled to receive the amplitude signal 156*a*, coupled to receive the temperature signal 160*a*, and coupled to receive the measured threshold signal 158*a*.

The threshold module 164 is configured to send, from time to time, to a memory module 166 for storage, selected ones of a temperature coefficient value 164*a* representative of the temperature coefficient signal 162*a*, a measured threshold value 164*b* representative of the measure threshold signal 158*a*, a temperature value 164*c* representative of the temperature signal 160*a*, an amplitude value 164*d* representative of the amplitude signal 156*a*, or a so-called safety bit (SB) 164*e* described more fully below.

The threshold and diagnostic module 150 can include the memory module 166. The memory module 166 can include a primary storage area 168 and a backup storage area 170. The primary storage area 168 and the backup storage area 170 can be nonvolatile and re-writable.

The memory module 166 can also include a storage area 172 configured to store an initial (e.g., predetermined) threshold value that can be used the very first time that the magnetic field sensor, e.g., 100 of FIG. 4, is powered up after installation. The storage area 172 can be nonvolatile. The storage area 172 can be either one-time writable or re-writable.

Upon request from the threshold module 164, which acts in-part as a memory manager, the memory module 166 can provide to the threshold module 164 selected ones of a stored temperature coefficient value 166*a*, a stored measured threshold value 166*b*, a stored temperature value 166*c*, a stored amplitude value 166*d*, a stored safety bit value 166*e*, a stored initial threshold value 166*f*, a stored backup temperature coefficient value 166*g*, a stored backup measured threshold value 166*h*, a stored backup temperature value 166*i*, or a stored backup amplitude value 166*j*.

The threshold module 164 is configured to use either some of or all of the stored values 166*a*-166*d*, or some of or all of the stored backup values 166*g*-166*j* in conjunction with the temperature signal 160*a*, to generate a calculated threshold value 164*f*, which is sent to and used by the TPOS detector 110 of FIG. 4.

The selection of which group of data to use can be determined by the stored safety bit 166*e*. If, for example, the stored safety bit 166*e* is in a first state, then the stored data 166*a*-166*d* is used, and, if the stored safety bit is in a second different state, then the stored backup data 166*g*-166*j* is used.

The safety bit 164*e*, 166*e* can be indicative of a proper storage of data. For example, when data storage begins, the safety bit 164*f* can be set to and stored as a particular state or value, and when the storage ends, the safety bit 164*f* can be set to and stored as a different particular state or value, indicating a proper storage of the data. Once retrieved, the stored safety bit 166*e* is indicative of the proper or improper storage of the data. If the storage of the data was proper, then the stored data 166*a*-166*d* can be used, but if the storage of data was not proper, then the backup stored data 166*g*-166*j* can used, or instead, the initial threshold value 166*f* can be used. The backup stored data 166*g*-166*j* can have been stored at an earlier time than the stored data 166*a*-166*d*. Improper storage can occur in circumstances described more fully below.

In some embodiments, the measured threshold value 164*b* stored in the memory module 166 can be representative of the measured threshold signal 158*a* at a particular and predetermined temperature, for example, twenty-five degrees Celsius. It will be recognized that having the stored temperature coefficient value 166*a*, along with the stored measured threshold value 166*b* at the known temperature, and along with the temperature signal 160*a*, the threshold module 164 can calculate the calculated threshold value 164*f* at any temperature experienced by the temperature sensor 160. The backup stored temperature coefficient value 166g, along with the backup stored measured threshold value 166h at the known temperature, along with the temperature signal 160a can also be used.

In other embodiments, the measured threshold value 164b stored in the memory module 166 can be representative of the measured threshold signal 158a at an arbitrary measured temperature. It will be recognized that having the stored temperature coefficient value 166a, along with the stored measured threshold value 166b at the arbitrary temperature, along with the stored temperature value 166c representative of the temperature at which the measured threshold value 164b was generated and stored as the stored measured threshold value 166b, and along with the temperature signal 160a, the threshold module 164 can calculate the calculated threshold value 164f at any temperature experienced by the temperature sensor 160. The backup stored temperature coefficient value 166g, the backup stored measured threshold value, and the backup stored temperature signal 166i, along with the temperature signal 160a can also be used.

As described above, it should be understood that, because the measured threshold signal 158a is corrected by the gain signal 152a, the stored measured threshold value 166b and the stored backup measured threshold value 166i are representative of threshold values (after adjustment to account for temperature using the temperature signal 160a and, in some embodiments, the stored temperature signal 166c) that are appropriate for comparison with the magnetic field signal 106a of FIG. 4, which is prior to the gain of the AGC 108 of FIG. 4.

It will be appreciated that the calculated threshold value 164f can be calculated in accordance with the stored measured threshold value 166b, the stored temperature coefficient value 166a, the temperature signal 160a, and, in some embodiments, the stored temperature value 166c. Thus, by using the stored values, which are retained during a power down of the magnetic field sensor 100 (FIG. 4) the calculated threshold value 166f can be generated very shortly after the magnetic field sensor 100 of FIG. 4 is powered up, each time it is powered up (other than a very first time), and the TPOS detector 110 can operate with a threshold properly centered and consistent regardless of changes in magnitude of the magnetic field signal 106a of FIG. 4, which may result from temperature and air gap changes and other changes. The resulting consistent threshold can be like the calculated threshold 56 of FIG. 2, which is properly centered in the magnetic field signal 52.

The calculated threshold value 164f can also be calculated and generated at other times while the magnetic field sensor 150 is powered up.

In operation, storage of the data 164a-164d into the primary storage area 168 of the memory module 166 can occur in a variety of ways and at a variety of times. For example, in one exemplary embodiment, storage of the data 164a-164d occurs at predetermined time intervals, for example, once per second. In another exemplary embodiment, storage of the data 164a-164d occurs based upon predetermined criteria. For example, the data 164a-164d can be stored at a time when the stored measured threshold value 166b differs from the measured threshold value 164b or from the measured threshold signal 158a by a predetermined amount or by a predetermined percentage. For another example, the data 164a-164d can be stored at a time when the stored temperature coefficient value 166a differs from the temperature coefficient value 164a or from the temperature coefficient signal 162a by a predetermined amount or by a predetermined percentage. For yet another example, the data 164a-164d can be stored at a time when the stored temperature value 166c differs from the temperature value 164c or from the temperature signal 160a by a predetermined amount or by a predetermined percentage. For yet another example, data 164a-164d can be stored at a time when the stored amplitude value 166d differs from the amplitude value 164d or from the amplitude signal 156a by a predetermined amount or by a predetermined percentage.

Calculation of and generation of the calculated threshold value 164f can occur at the same times as the above storage, or at different times, including, but not limited to, a time when the magnetic field sensor 150 first powers up. The above storing of values can occur at a plurality of storage times. The calculation and generation of the calculated threshold value 164f can occur at plurality of calculation times, which may or may not be times that include the plurality of storage times.

In operation, data stored in the primary storage a real 168 can be transferred to the backup storage area 172 in a variety of ways and at a variety of times. For example, in one exemplary embodiment, the transfer can occur at predetermined time intervals, for example, once per second. At the time of this transfer, data can be copied from the primary storage area 168 to the backup storage area 170, resulting in two same sets of data. In another exemplary embodiment, each time new data 164a-164d is stored to the primary storage area 168, data that had previously been stored in the primary storage area 168 can be moved to the backup storage area 170, resulting in two different sets of stored data.

It will be appreciated that, in some applications, for example automotive applications, the magnetic field sensor 100 of FIG. 4, which includes the threshold and diagnostic module 150 of FIG. 5, may power on and off as the automobile is turned on and off. In these applications, the power off may occur undesirably at the same time that the data 164a-164d is being stored to the primary storage area 168. In order to detect this undesirable circumstance, the safety bit 164e can be set while storage is occurring and cleared when storage is complete. If the stored safety 166e bit is in a state indicative of an interrupted storage event (e.g., power down during storage) when the threshold module 164 attempts to receive the stored data 166a-166d, then the threshold module 164 can deem the stored data 166a-166d to be invalid, in which case the threshold module 164 can instead use the stored backup data 166g-166j to compute the calculated threshold 164f.

However, in still other embodiments, if the stored safety 166e bit is in a state indicative of an interrupted storage event when the threshold module 164 attempts to receive the stored data 166a-166d, the threshold model 164 can revert to the initial threshold value 166f as the calculated threshold value 164f.

The threshold and diagnostic module 150 can also include a diagnostic module 174. The diagnostic module 174 can be coupled to receive selected ones of the amplitude signal 156a, the stored amplitude value 166d, the calculated threshold value 164f, the stored measured threshold value 166b, the temperature coefficient signal 162a, the stored temperature coefficient value 166a, and the stored safety bit 166e.

In operation, the diagnostic module 174 can compare one or more of the amplitude signal 156a with the stored amplitude value 166d, the calculated threshold value 164f with the stored measured threshold value 166b, or the temperature coefficient signal 162a with the stored temperature coefficient value 166a. Any difference greater than a respective predetermined limit or criteria can be identified as a failure of the magnetic field sensor 100 of FIG. 4.

In addition, the stored safety bit 166e can be examined to determine if the last data storage was proper and uninterrupted. If not proper, then a failure of the magnetic field sensor 100 of FIG. 4 can be identified.

Any of the above failures can be so indicated in a pass/fail value 174a, which can be stored in the memory module 166, and which can be provide to other circuits inside of or outside of the magnetic field sensor 100. A stored pass/fail value 166k can be obtained at any time that the magnetic field sensor 100 is under power.

The pass/fail value 174a and the corresponding stored pass fail value 166k can merely indicate a pass or a fail. However, in other embodiments, the pass/fail value 174a and the corresponding stored pass fail value 166k can be representative of one or more specific failures.

Figure 6:
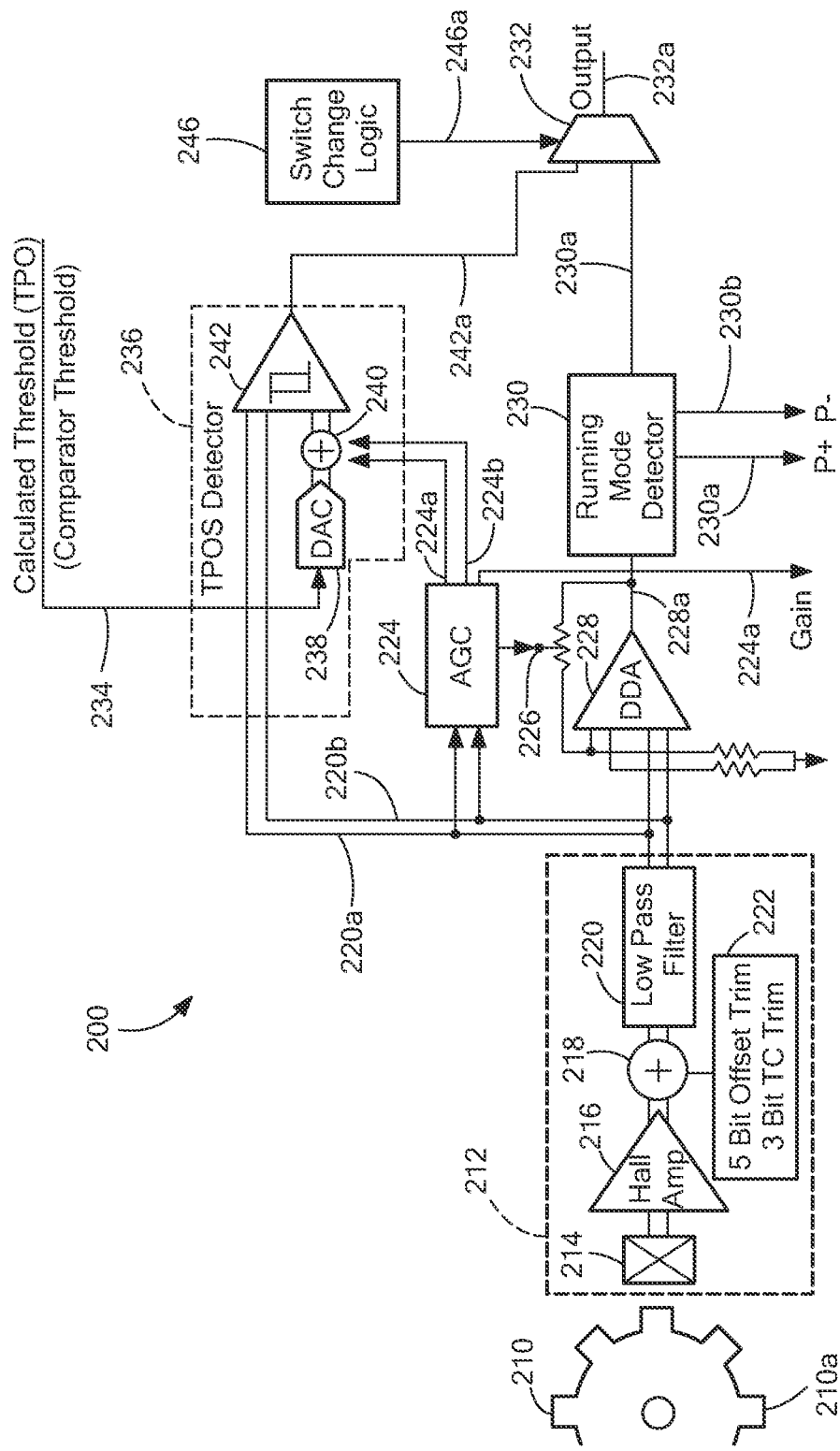
FIG. 6 is a block diagram showing further details of a portion of the magnetic field sensor of FIG. 4.

Referring now to FIG. 6, a portion 200 of a magnetic field sensor can be the same as or similar to the similar portion 104 of the magnetic field sensor 100 of FIG. 4, but shown in greater detail. The portion 200 includes a Hall element 214 responsive to a gear 210 having gear teeth, e.g., 210a. A Hall amplifier 216 is coupled to receive signals from the Hall element and configured to generate an amplified signal. A summing node 218 is coupled to receive the amplified signal and also coupled to receive an offset trim signal from an offset trim module 222. A low pass filter 220 is coupled to receive the signal from the summing node 218 and configured to generate a filtered signal as a differential signal 220a, 220b. The differential signal 220a, 220b can be the same as or similar to the magnetic field signal 106a of FIG. 4.

The differential magnetic field signal 220a, 220b is received by an automatic gain control (AGC) control module 224. The AGC control module 224 is configured to generate a control signal received by a gain control element 226, here shown to be a variable resistance element coupled to a dual differential amplifier (DDA) 228. The dual differential amplifier (DDA) 228 can be coupled to receive the differential magnetic field signal 220a, 220b, and configured to generate a gain controlled magnetic field signal 228a. The gain controlled magnetic field signal 228a can be the same as or similar to the amplified signal 108b of FIG. 4.

A running mode detector 230 can be coupled to receive the gain controlled magnetic field signal 228a and configured to generate an output signal 230a. The running mode detector can be the same as or similar to the running mode detector 112 of FIG. 4. The running mode detector is configured to generate an output signal 230a, which can be the same as or similar to the output signal 112a of FIG. 4.

A TPOS detector 236 can include a dual differential comparator 242 coupled to receive the differential magnetic field signal 220a, 220b. The TPOS detector 236 can also include a digital to analog converter (DAC) 238 coupled to receive a calculated threshold value 234. The calculated threshold value of 234 can be the same as or similar to the calculated threshold value 120a of FIG. 4 and the calculated threshold value 164f of FIG. 5. The TPOS detector 236 can be the same as or similar to the TPOS detector 110 of FIG. 4.

In some embodiments, the TPOS detector 236 can also include a summing node 240 coupled to receive a differential output signal from the DAC 238 and coupled to receive a differential output signal from the AGC control circuit 224. The dual differential comparator 242 can be coupled to receive an output signal (an adjusted threshold signal) from the summing node 240.

For embodiments in which the calculated threshold value 234 is referenced to the differential magnetic field signal 220a, 220b, the summing node 240 and the differential signal 224a, 224b can be omitted. For embodiments in which the calculated threshold value 234 is referenced to the gain controlled magnetic field signal 228a, the summing node 240 and the differential signal 224a, 224b can apply a correction to re-reference the calculated threshold value 234 to the differential magnetic field signal 220a, 220b.

The dual differential comparator 242 is configured to generate a TPOS output signal 242a. The output signal 242 can be the same as or similar to the output signal 110a of FIG. 4.

The output signals 242a, 230a can be received by an output switch 232, which can be the same as or similar to the output switch 114 of FIG. 4. Selection by the output switch 232 can be controlled by a control signal 246a generated by switch change logic 246. The switch change logic 246 can be the same as or similar to the switch change logic 116 of FIG. 4 and the control signal 246a can be the same as or similar to the control signal 116a of FIG. 4.

The portion 200 is configured to generate a gain signal 224a, as well as positive and negative peak signals 230a, 230b. The gain signal 224a can be the same as or similar to the gain signal 108c of FIG. 4 and the gain signal 152a of FIG. 5. The positive and negative peak signals 230a, 230b, respectively, can be the same as or similar to the positive and negative peak signals 112b, 112c, respectively, of FIG. 4 and the positive and negative peak signals 154a, 154b, respectively, of FIG. 5.

All references cited herein are hereby incorporated herein by reference in their entirety. Having described preferred embodiments, which serve to illustrate various concepts, structures and techniques, which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:
1. A magnetic field sensor, comprising:
a magnetic field sensing element responsive to a changing magnetic field and configured to generate a magnetic field signal having an amplitude;
a measured threshold module configured to generate a measured threshold signal in accordance with positive peaks and negative peaks of the magnetic field signal;
a temperature sensor configured to sense a temperature of the magnetic field sensor and configured to generate a temperature signal in accordance with the temperature;
a temperature coefficient module configured to generate a temperature coefficient signal in accordance with the temperature signal and the amplitude;
a memory device coupled to receive and configured to store, at each one of a plurality of storage times, a respective value of the temperature coefficient signal and a respective value of the measured threshold signal;
a threshold module coupled to receive, at a calculation time, a stored value of the temperature coefficient signal and a stored value of the measured threshold signal, each stored at a selected one of the plurality of storage times prior to the calculation time, coupled to receive the temperature signal, and configured to combine the received stored value of the temperature coefficient signal, the received stored value of the measured threshold signal, and the temperature signal to generate a calculated threshold value; and a comparator coupled to receive the calculated threshold value and also coupled to receive a signal representative of the magnetic field signal, wherein the comparator is configured to compare the calculated threshold value with a signal representative of the magnetic field signal to generate an output signal.

2. The magnetic field sensor of claim 1, wherein the respective value of the measured threshold signal stored at each one of the plurality of storage times is associated with a predetermined temperature.

3. The magnetic field sensor of claim 1, wherein the respective value of the measured threshold signal stored at each one of the plurality of storage times is associated with a respective measured temperature measured at each one of the plurality of storage times, wherein the memory device is further coupled to receive and configured to store, at each one of the plurality of storage times, a respective value of the temperature signal, wherein the threshold module is further coupled to receive, at the calculation time, a stored value of the temperature signal stored at the selected one of the plurality of storage times prior to the calculation time, and wherein the threshold module is configured to combine the received stored value of temperature coefficient signal, the received stored value of the measured threshold signal, the received stored value of the temperature signal, and the temperature signal to generate the calculated threshold value.

4. The magnetic field sensor of claim 1, wherein the magnetic field sensor is powered off between the selected one of the plurality of storage times and the calculation time, and wherein the memory device is nonvolatile and re-writable.

5. The magnetic field sensor of claim 1, wherein the memory device is further configured to store, at each one of the plurality of storage times, a respective safety bit indicative of a proper storage of the respective value of the temperature coefficient signal and the respective value of the measured threshold signal stored at each respective one of the plurality of storage times.

6. The magnetic field sensor of claim 5, wherein the memory device is further configured to store, at times proximate to each one of the plurality of storage times, a respective backup value of the temperature coefficient signal and a respective backup value of the measured threshold signal.

7. The magnetic field sensor of claim 6, wherein the memory device is further coupled to receive and configured to store, at each one of the plurality of storage times, a respective value of the temperature signal, and wherein the memory device is coupled to receive and configured to store, at the times proximate to each one of the plurality of storage times, a respective backup value of the temperature signal.

8. The magnetic field sensor of claim 6, wherein, if the stored safety bit, stored at the selected one of the plurality of storage times, is in a first state, the threshold module is configured to generate, at the calculation time, the calculated threshold value in accordance with the received stored value of the temperature coefficient signal and the received stored value of the measured threshold signal, and wherein, if the stored safety bit stored at the selected one of the plurality of storage times is in a second different state, the threshold module is configured to receive, at the calculation time, the stored backup value of the temperature coefficient signal and the stored backup value of the measured threshold signal, each stored at a time proximate to the selected one of the plurality of storage times prior to the calculation time, and wherein the threshold module is configured to generate the calculated threshold value in accordance with the received stored backup value of the temperature coefficient signal and the received stored backup value of the measured threshold signal.

9. The magnetic field sensor of claim 5, wherein, if the stored safety bit, stored at the selected one of the plurality of storage times, is in a first state, the threshold module is configured to generate the calculated threshold value in accordance with the received stored value of the temperature coefficient signal and the received stored value of the measured threshold signal, and wherein, if the stored safety bit stored at the selected one of the plurality of storage times is in a second different state, the threshold module is configured to generate the calculated threshold value as a predetermined value.

10. The magnetic field sensor of claim 1, further comprising a diagnostic module configured to compare the temperature coefficient signal and a stored value of the temperature coefficient signal stored one of the plurality of storage times, and configured to generate a fail value if the temperature coefficient signal and the stored value of the temperature coefficient signal differ by more than a predetermined amount.

11. The magnetic field sensor of claim 1, further comprising a diagnostic module configured to compare the calculated threshold value and a stored value of the measured threshold signal stored at one of the plurality of storage times, and configured to generate a fail value if the calculated threshold value and the stored value of the measured threshold signal differ by more than a predetermined amount.

12. The magnetic field sensor of claim 1, wherein the memory device is further coupled to receive and configured to store, at each one of the plurality of storage times, a respective value of an amplitude signal, the amplitude signal representative of the amplitude of the magnetic field signal, wherein the magnetic field sensor further comprises a diagnostic module configured to compare the amplitude signal and a stored value of the amplitude signal stored at one of the plurality of storage times, and configured to generate a fail value if the amplitude signal and the stored value of the amplitude signal differ by more than a predetermined amount.

13. The magnetic field sensor of claim 1, further comprising:

an amplitude module coupled to the magnetic field sensing element and configured to generate an amplitude signal representative of the amplitude of the magnetic field signal.

14. The magnetic field sensor of claim 1, further comprising a true power on state (TPOS) detector, wherein the true power on state (TPOS) detector includes the comparator.

15. A method of sensing a magnetic field with a magnetic field sensor, comprising:

generating a magnetic field signal having an amplitude in response to a magnetic field;

generating a measured threshold signal in accordance with positive and negative peaks of the magnetic field signal;

generating a temperature signal in accordance with a temperature;

generating a temperature coefficient signal in accordance with the temperature signal and the amplitude;
storing, at each one of a plurality of storage times, a respective value of the temperature coefficient signal and a respective value of the measured threshold signal;
receiving, at a calculation time, a stored value of the temperature coefficient signal and a stored value of the measured threshold signal, each stored at a selected one of the plurality of storage times prior to the calculation time;
combining the received stored value of the temperature coefficient signal, the received stored value of the measured threshold signal, and the temperature signal to generate a calculated threshold value; and
comparing the calculated threshold value with a signal representative of the magnetic field signal to generate an output signal.

16. The method of claim 15, wherein the respective value of the measured threshold signal stored at each one of the plurality of storage times is associated with a predetermined temperature.

17. The method of claim 15, wherein the respective value of the measured threshold stored at each one of the plurality of storage times is associated with a respective measured temperature measured at each one of the plurality of storage times, the method further comprising:
storing, at each one of the plurality of storage times, a respective value of the temperature signal;
receiving, at the calculation time, a stored value of the temperature signal stored at the selected one of the plurality of storage times prior to the calculation time; and
combining the received stored value of temperature coefficient signal, the received stored value of the measured threshold signal, the received stored value of the temperature signal, and the temperature signal to generate the calculated value.

18. The method of claim 15, further comprising powering off between the selected one of the plurality of storage times and the calculation time, and wherein the storing is non-volatile and re-writable.

19. The method of claim 15, further comprising:
storing, at each one of the plurality of storage times, a respective safety hit indicative of a proper storage of the respective value of the temperature coefficient signal and the respective value of the measured threshold signal stored at each one of the plurality of storage times.

20. The method of claim 19, further comprising:
storing, at times proximate to each one of the plurality of storage times, a respective backup value of the temperature coefficient signal and a respective backup value of the measured threshold signal.

21. The method of claim 20, further comprising:
storing, at each one of the plurality of storage times, a respective value of the temperature signal; and
storing, at the times proximate to each one of the plurality of storage times, a respective backup value of the temperature signal.

22. The method of claim 20, further comprising:
receiving the stored backup value of the temperature coefficient signal and the stored backup value of the measured threshold signal, wherein, if the stored safety bit stored at the selected one of the plurality of storage times is in a first state, the generating the calculated threshold value comprises:
generating the calculated threshold value in accordance with the received stored value of the temperature coefficient signal and the received stored value of the measured threshold signal, and wherein, if the stored safety bit stored at the selected one of the plurality of storage times is in a second different state, the generating the calculated threshold value comprises:
generating the calculated threshold value in accordance with the received stored backup value of the temperature coefficient signal and the received stored backup value of the measured threshold signal.

23. The method of claim 20, wherein, if the stored safety bit stored at the selected one of the plurality of storage times is in a first state, the generating the calculated threshold value comprises:
generating the calculated threshold value in accordance with the received stored value of the temperature coefficient signal and the received stored value of the measured threshold signal, and wherein, if the stored safety bit stored at the selected one of the plurality of storage times is in a second different state, the generating the calculated threshold value comprises:
generating the calculated threshold value as a predetermined value.

24. The method of claim 15, further comprising:
comparing the temperature coefficient signal and a stored value of the temperature coefficient signal stored at one of the plurality of storage times; and
generating a fail value if the temperature coefficient signal and the stored value of the temperature coefficient signal differ by more than a predetermined amount.

25. The method of claim 15, further comprising:
comparing the calculated threshold value and a stored value of the measured threshold signal stored at one of the plurality of times; and
generating a fail value lithe calculated threshold value and the stored value of the measured threshold signal differ by more than a predetermined amount.

26. The method of claim 15, further comprising:
storing, at each one of the plurality of storage times, a respective value of an amplitude signal, the amplitude signal representative of the amplitude of the magnetic field signal;
comparing the amplitude signal and a stored value of the amplitude signal stored at one of the plurality of storage times; and
generating a fail value if the amplitude signal and the stored value of the amplitude signal differ by more than a predetermined amount.

27. The method of claim 15, further comprising:
generating an amplitude signal representative of the amplitude of the magnetic field signal.

* * * * *

UNITED STATES PATENT AND TRADEMARK OFFICE
CERTIFICATE OF CORRECTION

PATENT NO. : 9,644,999 B2
APPLICATION NO. : 14/250574
DATED : May 9, 2017
INVENTOR(S) : Andrea Foletto et al.

Page 1 of 1

It is certified that error appears in the above-identified patent and that said Letters Patent is hereby corrected as shown below:

On the Title Page

Item (71), delete "Allegro Microsystems, LLC," and replace with --Allegro MicroSystems, LLC,--.

In the Specification

Column 1, Line 51, delete "in placed" and replace with --is placed--.

Column 3, Line 18, delete "to provide TPOS" and replace with --to provide a TPOS--.

Column 8, Line 66, delete "108*b* of Fig. 4." and replace with --108*c* of Fig. 4.--.

Column 10, Line 54, delete "can used," and replace with --can be used,--.

Column 12, Line 19, delete "a real 168" and replace with --area 168--.

Column 13, Line 56, delete "value of 234" and replace with --value 234--.

Column 14, Line 38, delete "that that" and replace with --that the--.

Signed and Sealed this
Thirtieth Day of October, 2018

Andrei Iancu
*Director of the United States Patent and Trademark Office*